United States Patent
Shah et al.

(10) Patent No.: US 9,407,615 B2
(45) Date of Patent: Aug. 2, 2016

(54) SINGLE SET OF CREDENTIALS FOR ACCESSING MULTIPLE COMPUTING RESOURCE SERVICES

(71) Applicant: Amazon Technologies, Inc., Reno, NV (US)

(72) Inventors: Shon Kiran Shah, Redmond, WA (US); Gaurang Pankaj Mehta, Seattle, WA (US); Venakta N. S. S. Harsha Koonaparaju, Redmond, WA (US); Thomas Christopher Rizzo, Sammamish, WA (US); Guruprakash Bangalore Rao, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/098,341

(22) Filed: Dec. 5, 2013

(65) Prior Publication Data
US 2015/0135257 A1     May 14, 2015

Related U.S. Application Data

(60) Provisional application No. 61/902,790, filed on Nov. 11, 2013.

(51) Int. Cl.
*H04L 29/06*     (2006.01)
*G06F 21/00*     (2013.01)
(Continued)

(52) U.S. Cl.
CPC ............... *H04L 63/08* (2013.01); *H04L 63/20* (2013.01); *H04L 63/102* (2013.01)

(58) Field of Classification Search
CPC ............ H04L 63/08; H04L 63/20; H04L 9/32
See application file for complete search history.

(56) References Cited

U.S. PATENT DOCUMENTS 6,055,637 A * 4/2000 Hudson et al. .................. 726/20
8,307,003 B1   11/2012 Sheth et al.
(Continued)

FOREIGN PATENT DOCUMENTS

WO    WO 2011106716 A1 * 9/2011 ............ H04L 9/3215

OTHER PUBLICATIONS

Bucicoiu, M.; Ghideu, M.; Tapus, N.; "Secure cloud video streaming using tokens"; RoEduNet Conference 13th Edition: Networking in Education and Research Joint Event RENAM 8th Conference, 2014; Year: Jan. 2014; pp. 1-6.*

(Continued)

*Primary Examiner* — Andrew Nalven
*Assistant Examiner* — Courtney Fields
(74) *Attorney, Agent, or Firm* — Davis Wright Tremaine LLP

(57) ABSTRACT

A user may utilize a set of credentials to access, through a managed directory service, one or more services provided by a computing resource service provider. The managed directory service may be configured to identify one or more policies applicable to the user. These policies may define the level of access to the one or more services provided by the computing resource service provider. Based at least in part on these policies, the managed directory service may transmit a request to an identity management system to obtain a set of temporary credentials that may be used to enable the user to access the one or more services. Accordingly, the managed directory service may be configured to enable the user, based at least in part on the policies and the set of temporary credentials, to access an interface, which can be used to access the one or more services.

20 Claims, 10 Drawing Sheets

(51) Int. Cl.
  *G06F 15/16* (2006.01)
  *G06F 7/04* (2006.01)
  *H04L 9/32* (2006.01)

(56) References Cited

U.S. PATENT DOCUMENTS

| | | | |
|---|---|---|---|
| 8,533,796 | B1 | 9/2013 | Shenoy et al. |
| 8,656,471 | B1 * | 2/2014 | Allen et al. ............ 726/7 |
| 2002/0143943 | A1 | 10/2002 | Lee et al. |
| 2004/0205152 | A1 | 10/2004 | Yasuda et al. |
| 2005/0203993 | A1 | 9/2005 | Grobman et al. |
| 2007/0112877 | A1 | 5/2007 | Harvey et al. |
| 2008/0140618 | A1 | 6/2008 | Kumar |
| 2009/0089625 | A1 | 4/2009 | Kannappan et al. |
| 2009/0328178 | A1 | 12/2009 | McDaniel et al. |
| 2010/0017889 | A1 | 1/2010 | Newstadt et al. |
| 2010/0254375 | A1 | 10/2010 | Feuerhahn et al. |
| 2011/0099147 | A1 | 4/2011 | McAlister et al. |
| 2011/0251992 | A1 | 10/2011 | Bethlehem et al. |
| 2011/0314520 | A1 | 12/2011 | Olszewski et al. |
| 2012/0233314 | A1 | 9/2012 | Jakobsson |
| 2012/0246738 | A1 | 9/2012 | Shah et al. |
| 2012/0266168 | A1 | 10/2012 | Spivak et al. |
| 2013/0007845 | A1 | 1/2013 | Chang et al. |
| 2013/0042115 | A1 | 2/2013 | Sweet et al. |
| 2013/0066834 | A1 | 3/2013 | McAlister et al. |
| 2013/0174216 | A1 | 7/2013 | Simske et al. |
| 2013/0227140 | A1 | 8/2013 | Hinton et al. |
| 2013/0254847 | A1 | 9/2013 | Adams et al. |
| 2013/0283270 | A1 | 10/2013 | Holland et al. |
| 2013/0283298 | A1 | 10/2013 | Ali et al. |
| 2014/0040993 | A1 | 2/2014 | Lorenzo et al. |
| 2014/0075501 | A1 | 3/2014 | Srinivasan et al. |
| 2014/0298398 | A1 | 10/2014 | Neely |

OTHER PUBLICATIONS

International Search Report and Written Opinion mailed Feb. 4, 2015, International Patent Application No. PCT/US2014/064894, filed Nov. 10, 2014, 14 pages.

International Search Report and Written Opinion mailed Feb. 19, 2015, International Patent Application No. PCT/US2014/065084, filed Nov. 11, 2014, 15 pages.

International Search Report and Written Opinion mailed Feb. 11, 2015, International Patent Application No. PCT/US2014/065081, filed Nov. 11, 2014, 11 pages.

International Search Report and Written Opinion mailed Feb. 23, 2015, International Patent Application No. PCT/US2014/065088, filed Nov. 11, 2014, 13 pages.

* cited by examiner

SINGLE SET OF CREDENTIALS FOR ACCESSING MULTIPLE COMPUTING RESOURCE SERVICES

CROSS REFERENCE TO RELATED APPLICATIONS

This application claims the benefit of U.S. Provisional Application No. 61/902,790, filed on Nov. 11, 2013, entitled "MANAGED DIRECTORY SERVICE," the content of which is incorporated by reference herein in its entirety.

BACKGROUND

Customers utilize directory services to create and maintain a directory (e.g., file systems, files, users, security policies, network resources, applications, system storage, etc.) for data management and, generally, access to a variety of resources. The directory service may be configured to create a directory in a data center operated by the customer (e.g., on-premises) or in a remote network (e.g., off-premises), dependent on the customer's business needs. However, a customer desiring to maintain a directory on-premises and off-premises may encounter numerous difficulties. For instance, a customer utilizing an on-premises directory may be required to create a separate directory off-premises and sync data between the two directories to maintain the same set of data. This may require the customer to maintain multiple accounts for each user of the directories. Further, maintenance of multiple directories may increase the administrative burden of the customer, as maintenance and security of the multiple directories may require additional resources to perform. Exacerbating the problem, users may have to perform a complex set of operations to obtain one or more additional sets of credentials to access the directory and one or more other services provided by the computing resource service provider.

BRIEF DESCRIPTION OF THE DRAWINGS

Various embodiments in accordance with the present disclosure will be described with reference to the drawings, in which.

DETAILED DESCRIPTION

Figure 1:
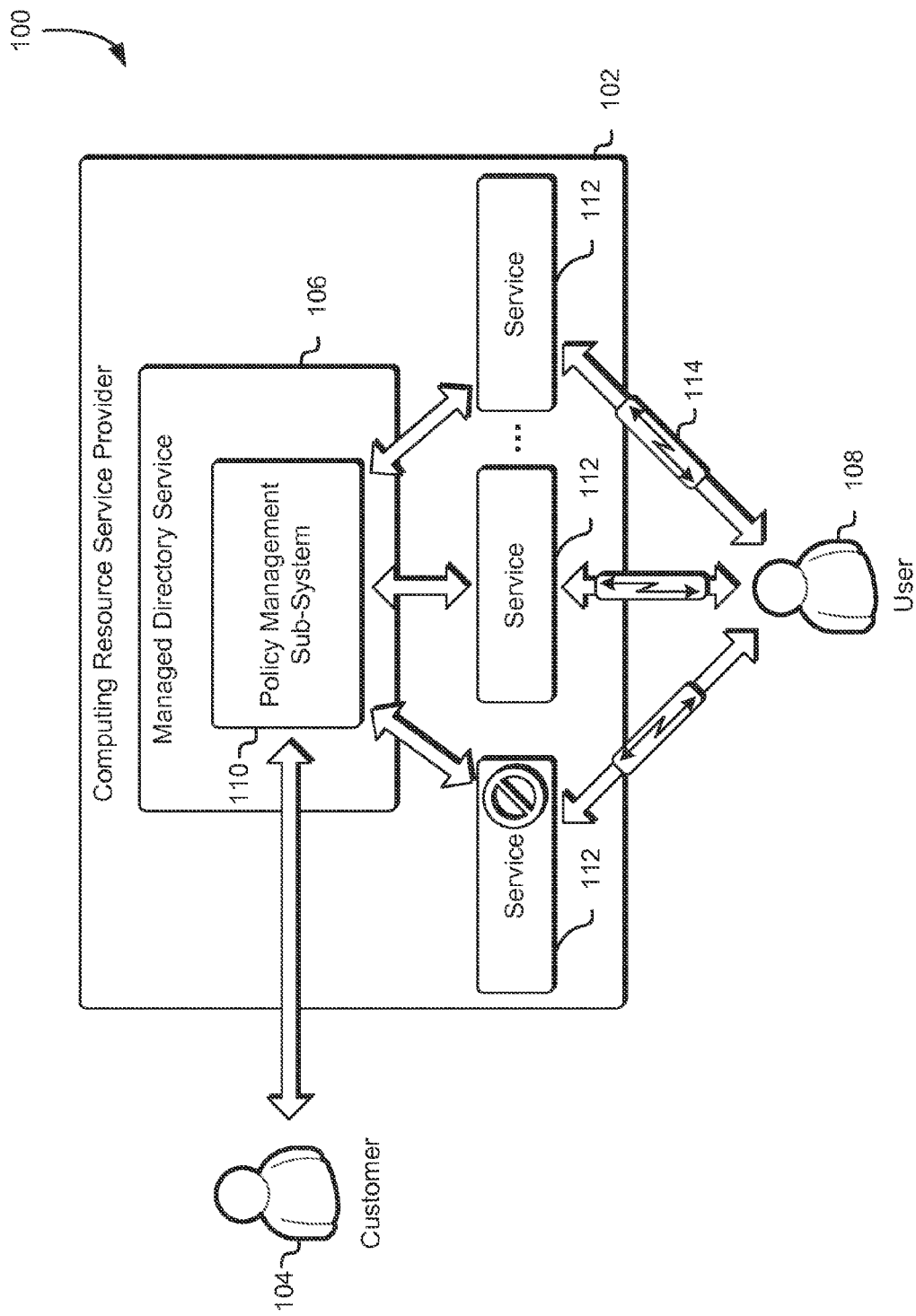
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the centralized policy management of one or more users such that one set of credentials may be used to access a directory and one or more services provided by a computing resource service provider. In an embodiment, an entity (e.g., an organization) responsible for the administration of a directory made available through a managed directory service specifies one or more policies for a user or a plurality of users that utilize the directory. The entity may be a customer of a computing resource service provider that operates various services such as a virtual computer system service, object-based data storage services, database services, the aforementioned managed directory service and a plurality of other services.

In some embodiments, the customer communicates with a policy management sub-system within the managed directory service to define one or more policies that affect a user's access to applications and resources managed by the directory and/or a user's access to one or more other services provided by the computing resource service provider. For instance, the customer may create a policy that prevents a user or a group of users from executing a particular application (e.g., word processing application, photo editing application, etc.) within the directory. In another instance, the customer may create a policy that prevents a user or a group of users from accessing a virtual computer system service provided by the computing resource service provider or executing write actions within a database service provided by the computing resource service provider.

In an embodiment, once the user policies have been generated, the user may utilize a Uniform Resource Identifier (URI) which may be used by a user or a group of users to access a computing resource service provider interface. This computing resource service provider interface may be configured to enable a user or a group of users to access one or more services provided by the computing resource service provider. For instance, a user may use the computing resource service provider interface to access a virtual computer system service and request provisioning of a virtual machine instance. The computing resource service provider interface may additionally be customized according to the defined applicable user policies. For instance, if a defined user policy specifies that the user is not permitted to access an object-based data storage service, the computing resource service provider interface may be configured to not include any authorizations related to this service.

In an embodiment, when a user utilizes the URI to access the computing resource service provider interface, the policy management sub-system within the managed directory service obtains the defined user policies to determine the parameters for access to the various services provided by the computing resource service provider. Once the user policies have been obtained, the policy management sub-system may communicate with an identity management service, such as through one or more appropriately configured application programming interface (API) calls to the service, to request temporary credentials associated with the services the user has been granted access to. Accordingly, these temporary credentials may be transmitted to the policy management sub-system in order to enable user access to the permissible services and operations. Additionally, the policy management sub-system may further communicate with the identity management service to provide the user-specific policies that are to be enforced. Once the policy management sub-system has received the temporary sets of credentials and has transmitted the policies to be enforced to the identity management service, the policy management sub-system may enable the user to access the customized computing resource service provider interface.

In this manner, a user or a group of users of a directory may use the single set of credentials used to access the directory in order to access one or more other services provided by the computing resource service provider without having to manage additional sets of credentials for these one or more other services. In addition, the techniques described and suggested herein facilitate additional technical advantages. For example, because the customer may utilize a policy management sub-system within the managed directory service to specify user policies for any service provided by the computing resource service provider, the customer may not be required to access any other services or interfaces to specify service-specific user policies. This, in turn, may reduce the potential administrative burden on the customer.

FIG. 1 shows an illustrative example of an environment 100 in which various embodiments may be practiced. In the environment 100, a computing resource service provider 102 provides various computing resource services to one or more customers of the computing resource service provider. The computing resource service provider 102 may be an organization that hosts various computing resources on behalf of one or more customers. For example, a computing resource service provider may operate one or more facilities that are used to host various computing hardware resources, such as hardware servers, data storage devices, network devices, and other equipment, such as server racks, networking cables and the like. The computing resource service provider may utilize its computing hardware resources to operate one or more services. Such services may include services that enable customers of the computing resource service provider to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services may be used by customers to support a wide variety of activities, such as operating a website, operating enterprise systems supporting an organization, distributed computation and/or other activities.

Accordingly, as illustrated in FIG. 1, the environment 100 includes a customer 104. The customer 104 may be an organization that could utilize one or more services provided by the computing resource service provider 102 to operate and manage one or more directories (e.g., file systems, files, users, security policies, network resources, applications, system storage, etc.) to support his or her operations. The customer 104 may, through a customer computer system device, submit one or more requests to a managed directory service 106 provided by the computing resource service provider 102 to configure a directory which may be used to facilitate data sharing and/or availability amongst one or more users 108. Accordingly, the managed directory service 106 may additionally include a policy management sub-system 110 which may be configured to allow a customer 104 to generate and modify one or more user profiles to define remote access to one or more applications and resources available within the directory and/or one or more other services 112 provided by the computing resource service provider 102. For instance, the customer 104 may access the policy management sub-system 110 to allow a user 108 to access a word processing application within the directory and a virtual computer system service provided by the computing resource service provider 102 while prohibiting access to other applications and services.

As will be described in greater detail below, a customer 104 may interact with a user profile interface to access a policy generator and, accordingly, the policy management sub-system 110. In an embodiment, the customer 104 can access the policy management sub-system 110 through a policy generator button available in each user profile within the managed directory service 106. The policy generator may enable the customer 104 to specify one or more policies that may be used to define a level of access to various applications and/or services for a particular user 108. Accordingly, when the customer 104 defines the applicable policies that are to be applicable to a particular user 108 through the policy generator, the policy generator may transmit one or more executable instructions to the policy management sub-system 110 to incorporate and enforce the specified policies. Additionally, in an embodiment, when the customer 104 specifies one or more policies that enable a user 108 to access one or more services 112 provided by the computing resource service provider 102, the policy management sub-system 110 transmits a URI 114 to the user 108 that may be used by the user 108 to access a computer resource service provider interface in order to access and utilize the applicable services 112 in accordance with the implemented policies. Alternatively, the customer 104 may transmit the URI 114 to the user 108, such as through electronic mail or other delivery system, once the one or more policies have been defined for the user 108.

When the user 108 accesses the directory and uses the URI 114 to access the computing resource service provider interface, the policy management sub-system 110 may access the user's directory profile to identify the policies specified by the customer 104 that are to be enforced. Based at least in part on these policies, the policy management sub-system may be configured to transmit one or more executable instructions to an identity management system (not shown) to obtain temporary credentials for accessing the one or more services 112 provided by the computing resource service provider 102 and/or define one or more actions the user 108 may undertake within these services. Once the policy management sub-system 110 has obtained these credentials, the policy management sub-system 110 may generate a user-specific computing resource service provider interface and enable the user 108 to access the one or more services 112 provided by the computing resource service provider 102 according to the policies defined by the customer 104 and applicable to the user 108.

Figure 2:
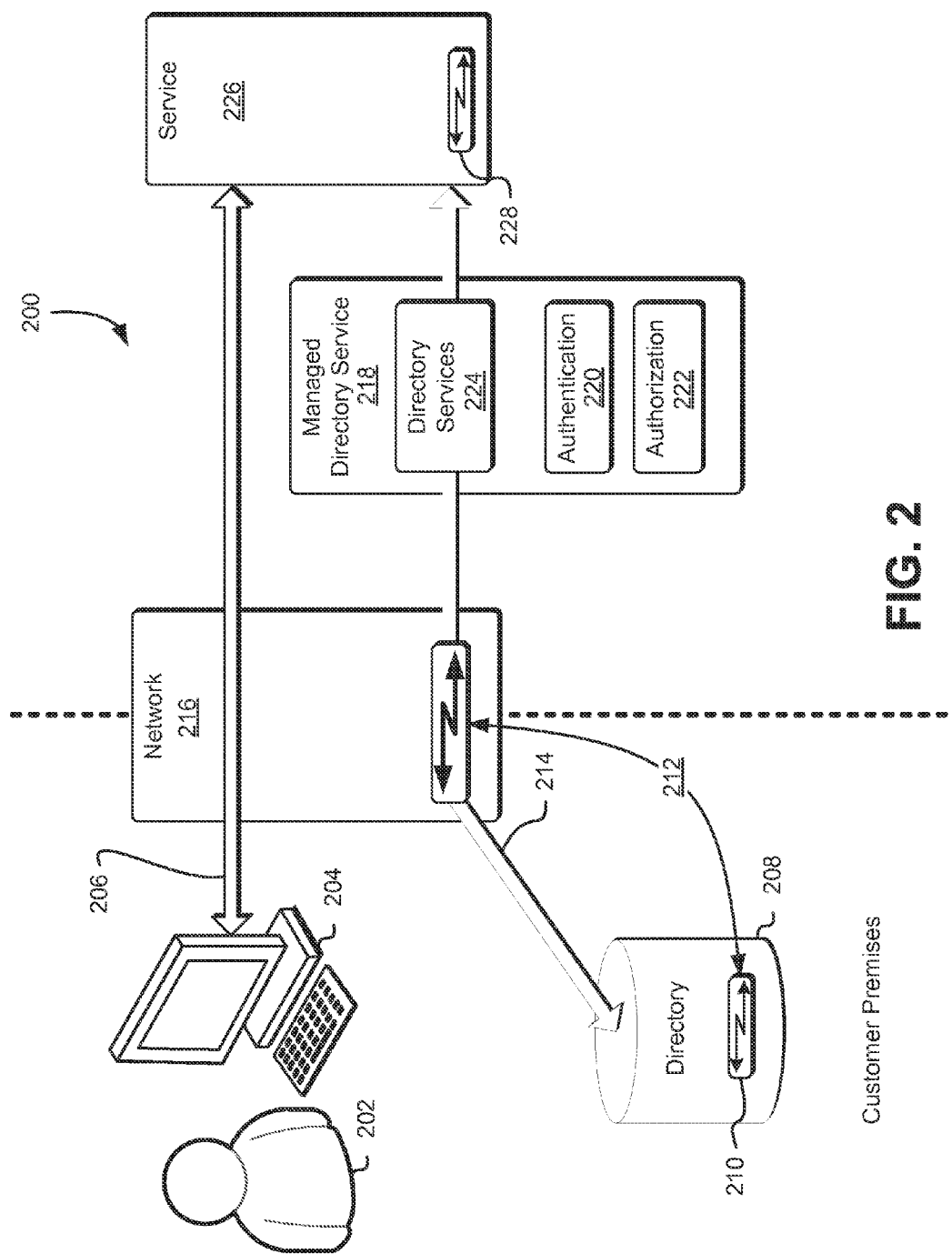
FIG. 2 shows an illustrative example of an environment for accessing directory objects on distributed computer system environments as well as the associated code running thereon in accordance with at least one embodiment.

FIG. 2 illustrates an environment 200 for accessing computer system directory resources including, but not limited to, computer system services such as directory services and resources such as user resources, policy resources, network resources and/or storage resources associated with the directory services, on distributed and/or virtualized computer system environments as well as the associated code running thereon in accordance with at least one embodiment. A computer system entity, user or process 202 may connect to a computer system through a computer system client device 204 and may request access via connection 206 to one or more services 226. The command or commands to request access to a service may originate from an outside computer system and/or server, or may originate from an entity, user or process on a remote network location, or may originate from the computer system, or may originate from a user of the computer system client device, or may originate as a result of a combination of these and/or other such objects. The command or commands to request access to a service may, in some embodiments, be issued by a privileged user, or by an unprivileged user, or by an autonomous process, or as a result of an alarm or condition or by a combination of these and/or other methods.

The computer system client device may request access to services via one or more networks 216 and/or entities associated therewith, such as other servers connected to the network, either directly or indirectly. The computer system client device may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others.

In some embodiments, the computer system may include one or more local computer system resources 208 which may be located at least in part on the customer premises and which may store files and/or other computer system resources thereon including, but not limited to, directories, applications, data, databases, links to other computer system resources, system drivers, computer operating systems, virtual machines and/or other such resources. In some embodiments, the local computer system resources may be local file system resources and may be stored on a variety of storage devices such as system random access memory (RAM), disk drives, solid state drives, removable drives or combinations of these and/or other such storage devices. In some embodiments, the local computer system resources may be located at least in part in a datacenter (a plurality of computer system resources, services and/or storage devices that may be collocated) that may be accessed by the computer system client device via one or more connections such as, for example, the network connections described herein. The computer system resources and/or the datacenter may be located locally or a combination of locally and remotely. For example, in some embodiments, a file system and/or directory may be located on a disk located in a local datacenter and the contents of the file system and/or directory may also be replicated to a disk located in a remote datacenter. In some other embodiments, a file system and/or directory may have at least a part of its contents located in one datacenter that may be local, and other parts of its contents located in one or more other datacenters that may be local or remote. The storage devices may include physical devices such as those described herein and/or virtual representations of such physical devices. For example, a file system and/or directory storage device may include some amount of physical memory, part of which is dedicated to storage as a virtual disk drive with a file system created on the virtual disk drive. Other such local storage devices may be considered as within the scope of this disclosure.

In some embodiments, the service 226 may need access to one or more computer system directory resources such as those described herein. The service 226 may, in some embodiments, include a variety of other computer system entities including, but not limited to, users, other computer systems, processes and/or automated processes and/or other such computer system entities. Access 214 to the system directory resources may, in some embodiments, be provided by a service such as a managed directory service 218, which may provide access to one or more system resources. The managed directory service may provide a variety of services to enable computer systems and/or computer system client devices to access system resources including, but not limited to, 220 authentication, 222 authorization and 224 directory services.

For example, the managed directory service may provide 220 authentication services which may authenticate credentials of a user, computer system, process, automated process or other such entity to at least determine whether that entity is authorized to access the managed directory service and/or the system resources associated with the managed directory service. In some embodiments, the credentials may be authenticated by the managed directory service itself, or they may be authenticated by a process, program or service under the control of the managed directory service, or they may be authenticated by a process, program or service that the managed directory service may communicate with, or they may be authenticated by, a combination of these and/or other such services or entities.

The managed directory service may also provide 222 authorization services which may authorize a user, computer system, process, automated process or other such entity to at least determine which actions of one or more possible actions that entity may perform. For example, in the case of a computer system resource such as a file system resource, actions that an entity may or may not be authorized to perform include, but are not limited to, creating file systems on the file system resource, destroying file systems on the file system resource, attaching to file systems on the file system resource, detaching from file systems on the file system resource, providing access links to file systems on the file system resource, reclaiming access links to file systems on the file system resource, allowing reads from file systems on the file system resource, allowing writes to file systems on the file system resource and/or other such file system resource actions.

Actions on system resources may include, but not be limited to, actions on directories, files, applications, data, databases, links to other resources, system drivers, operating systems, virtual machines and/or other such system resource objects thereon and may include such actions as the actions mentioned herein. Actions to start, stop, reclaim, destroy and/or otherwise manage the system resources as well as other such actions may also be included in the available actions. Authorization to perform actions may be managed by an entity such as a credentialing or policy system such as a system that, for example, maintains a set of credentials and/or policies related to a certain entity and may determine, based at least in part on the set of credentials and/or policies which actions an entity is authorized to perform. The actions that an entity may be authorized to perform may be static or may vary according to a number of factors including, but not limited to, time of day, type of credentials, system policies, nature, type or location of the object being accessed or a combination of these and/or other such authorization factors. For example, a computer system entity may be authorized only to read certain files on a file system, to read and write certain other files on a file system, and to add and delete certain other files on a file system. A different computer system entity may be authorized to perform any actions on the file system, but only if those actions are initiated from a certain location and at a certain time. One or more processes may be authorized only to write to a file on a file system, such as, for example, a system log, while other processes may only be authorized to read from the file. As may be contemplated, these are illustrative examples. Other types of operations may be authorized by the managed directory service authorization system and such other types of operations are also considered as being within the scope of the present disclosure.

The managed directory service may also provide 224 directory services which may provide an authenticated entity access 214 to computer system resources according to the authorization credentials and/or policies. For example, in an embodiment where a computer system entity may be authorized to read and write a certain data store on a computer system resource such as a file system resource, the ability to do so may be provided by the directory services. Directory services may provide access to the file system resource by providing links to the file system resource locations such as by a URI object or some other such linkage. The URI may be provided by the computer system client device, or by a process running at the data center, or by a process running on a computer system connected to the datacenter, or by the managed directory service or by a combination of these and/or other such computer system entities.

In some embodiments, the access to the computer system resources may be provided in such a way that the access is invisible to the requesting entity. For example, the access 214 may be provided to a requesting entity as a URI or other such link to a location 210 on the local file system 208. The location on the computer system resource may be 212 translated into a URI by one or more processes running on the computer system. The service or entity 226 that requested the access to the computer system resource may use the 228 received URI to access the computer system resource without requiring configuration that is dependent on the location of the computer system resource and may, in some embodiments, use the URI to link to the computer system resource to operate as if the service or entity 226 were directly connected to the computer system resource. Operations that, for example, appear to write a set of data to a file that may appear to the service or entity to be located in a location local to the service or entity, may actually package the data into a network packet and may then transfer the packet over the network 216 via the access link 214, to be actually written to a file located on local file system 208. As may be contemplated, these are illustrative examples and other types of operations which may be performed by the managed directory service may also be considered as within the scope of the present disclosure.

Figure 3:
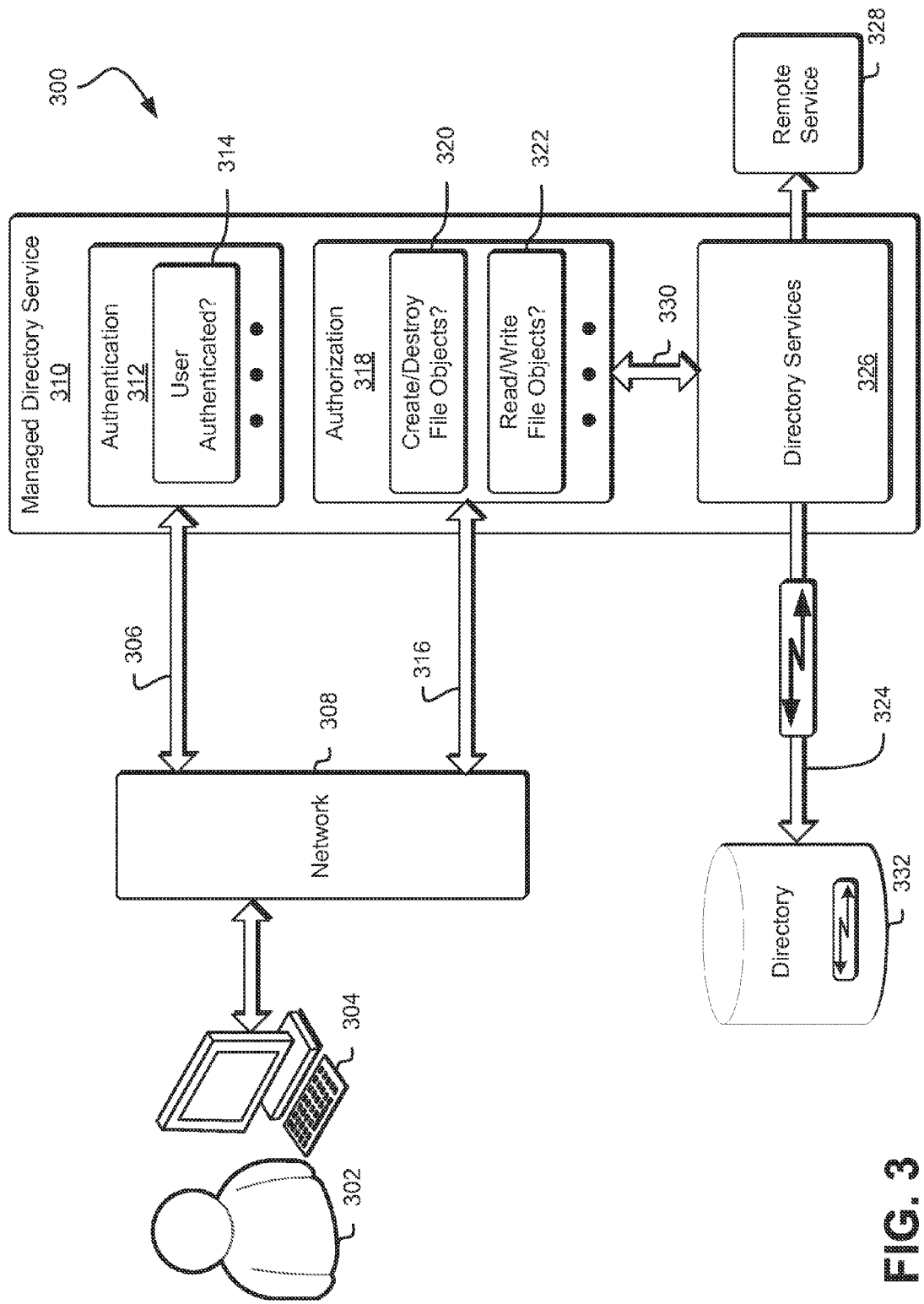
FIG. 3 shows an illustrative example of an environment for servicing user requests for authentication, authorization and access to remote directory objects on distributed computer system environments in accordance with at least one embodiment.

FIG. 3 illustrates an environment 300 for servicing user requests for authentication, authorization and access by local and/or remote services to local and/or remote computer system resources on distributed and/or virtualized computer system environments as described herein at least in connection with FIG. 2 and in accordance with at least one embodiment. A computer system entity, user or process 302 may connect to a computer system through a computer system client device 304 and may 306 request authentication of credentials in order to facilitate access by the computer system entity, user or process to one or more local and/or remote services. The command or commands to request authentication of credentials may originate from an outside computer system and/or server, or may originate from an entity, user or process on a remote network location, or may originate from the computer system, or may originate from a user of the computer system client device, or may originate as a result of a combination of these and/or other such objects. The command or commands to request authentication of credentials may, in some embodiments, be issued by a privileged user, or by an unprivileged user, or by an autonomous process, or as a result of an alarm or condition or by a combination of these and/or other methods.

The computer system client device 304 may be connected to the computer system using one or more networks 308 and/or entities associated therewith, such as other servers connected to the network, either directly or indirectly. The computer system client device may include any device that is capable of connecting with the computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others.

In some embodiments, the computer system client device 304 may access one or more authentication processes 312 running on and/or under the control of a managed directory service 310 wherein the authentication processes may be configured to at least respond to requests from external processes and to authenticate the credentials of requesting computer system entities, users or processes. For example, the authentication processes may validate 314 whether a requesting computer system entity, user or process is allowed to access the managed directory service. The authentication process may validate access to the managed directory service by verifying a user name and password combination, or by verifying a cryptographic key stored on a hardware, software, firmware or other such device, or by verifying whether the computer system client device is authorized to request access, or by verifying whether the network is authorized to request access or by a combination of these and/or other such verification methods. The authentication process may perform other such authentication tasks and may, in some embodiments, perform authentication tasks in combination with other processes running on and/or with data stored on the computer system and/or on other computer systems.

In some embodiments, a computer system entity, user or process 302 as described herein may connect to a computer system through a computer system client device 304 as described herein, using one or more networks 308 and/or entities associated therewith as described herein, and may 316 request authorization to perform one or more operations and/or processes on one or more computer system resources 332 which may be located, for example, at least in part in a data center such as the datacenter described herein at least in connection with FIG. 2 and in accordance with at least one embodiment. In some embodiments, the requested operation authorization may be a requested authorization to directly perform one or more computer system resource operations. In some embodiments, the requested operation authorization may be a requested operation to indirectly perform one or more computer system resource operations. For example, the requested operation authorization may be a request for authorization for a remote computer system service, process or entity under the control of the computer system entity, user or process 302 for authorization to perform one or more computer system resource operations. The authorization may be requested from one or more authorization processes 318 running on and/or under the control of a managed directory service 310 wherein the authorization processes may be configured to at least respond to requests from external processes and to authorize the performance of one or more operations and/or processes by the computer system entity, user or process on one or more computer system resources 332. The computer system resource may be located locally such as in a datacenter on the customer premises, or may be located remotely, or may be located in multiple remote locations such as on a distributed and/or virtual computer system or may be located in a combination of local and/or remote locations. For example, a file system may be located on a local disk located in a local datacenter and the contents of the file system may also be replicated to a one or more remote disks located in one or more remote datacenters. In some embodiments, a file system may have at least a part of its contents located in one datacenter that may be local or remote, and other parts of its contents located in one or more other datacenters.

Examples of operations and/or processes that may be authorized include, but are not limited to, 320 creating and/or destroying resource objects, 322 reading and/or writing resource objects and/or other such system resource operations. Authorization may vary by entity, user or process, by time of the day, by class of entity, by class of user, by class of process, by one or more system policies, by the nature of the request or by a combination of these and/or other such considerations. For example, a computer system entity may be authorized to create files and/or directories but may not be authorized to delete them, or a process may be authorized only to delete files and/or directories that were created by that process and no others, or an entity may be authorized to read certain files in certain directories, but not others. As may be contemplated, these are illustrative examples. Other types of operations may be authorized by the managed directory service authorization system and such other types of operations are also considered as being within the scope of the present disclosure.

In some embodiments, a computer system entity, user or process 302 as described herein may connect to a computer system through a computer system client device 304 as described herein, using one or more networks 308 and/or entities associated therewith as described herein, and may 324 create and/or instantiate one or more local and/or remote services 328 that may request access to one or more file systems 332. In some embodiments, the computer service, process or entity 328 may access one or more directory services processes 326 running on and/or under the control of a managed directory service 310 wherein the directory services processes may be configured to at least respond to requests from external processes and to provide access to one or more file systems. Access to one or more file systems may include access to operations such as operations to read, write, execute, delete, create, instantiate and/or other such operations, on files and/or other file system objects such as directories, applications, data, databases, links to other file systems, system drivers, computer operating systems, virtual machines and/or other such file system objects. In some embodiments, access to operations may be facilitated by communication 330 with one or more authorization processes 318 as described herein, providing authorization according to resource authorization policies contained therein.

Figure 4:
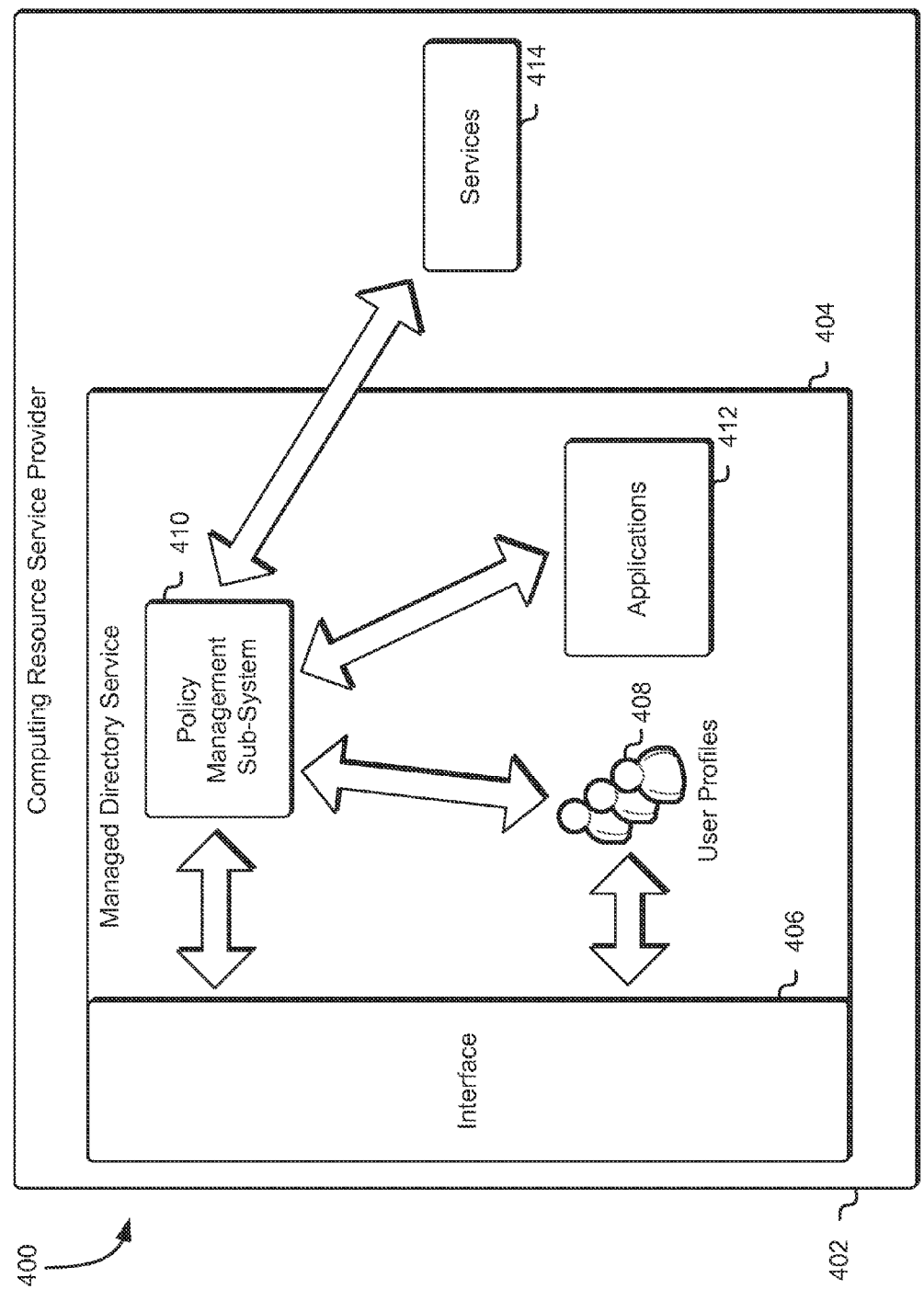
FIG. 4 shows an illustrative example of an environment in which various embodiments can be implemented.

FIG. 4 shows an illustrative example of an environment 400 that includes various components of a managed directory service 404 provided by a computing resource service provider 402 in accordance with at least one embodiment. The managed directory service 404 may provide customers and delegated administrative users (e.g., users identified by a customer to have administrative permissions to perform one or more actions typically allowed to the customer) with an interface 406 that may enable a customer or a delegated administrative user to access the managed directory service 404. A customer or a delegated administrative user may utilize the interface 406 through one or more communications networks, such as the Internet. The interface 406 may comprise certain security safeguards to ensure that the customer or delegated administrative user has authorization to access the managed directory service 404. For instance, in order to access the managed directory service 404, a customer may need to provide a username and a corresponding password or encryption key when using the interface 406. Additionally, requests (e.g., API calls) submitted to the interface 406 may require an electronic signature generated using a cryptographic key such that the electronic signature is verifiable by the managed directory service 404, such as by an authorization system (not shown).

Through the interface 406, the customer or delegated administrative user may be able to view the directory structure, including a listing of all available computers within the directory and the users authorized to access the directory. Accordingly, the customer or delegated administrative user may use the interface 406 to access one or more user profiles 408 to view user properties (e.g., first name and last name, location, phone number, etc.) and define one or more policies that may be used to determine a level of access to one or more services 414 provided by the computing resource service provider 402, as well as a level of access to one or more applications 412 and/or other resources managed by the directory. As will be described in greater detail below in connection with FIGS. 5-7, each user profile 408 may include a policy generator button that, when selected, enables a customer or delegated administrative user to access a policy generator to define these one or more policies. For instance, through the policy generator, a customer or delegated administrative user may specify which services 414 a user may access and the actions that the user may take within these services 414. Accordingly, once the customer or delegated administrative user has defined the applicable user policies through the policy generator, the customer or delegated administrative user may be able to view the applied policies within the user profile 408. In addition, the policy generator may transmit one or more executable instructions to a policy management sub-system 410 which may cause the policy management sub-system 410 to enable the user to utilize a URI to access a computing resource service provider interface. This computing resource service provider interface may enable a user to access the one or more services 414 provided by the computing resource service provider 402 from within the directory.

In an embodiment, when a user utilizes the URI from within the directory to access the computing resource service provider interface, a policy management sub-system 410 within the managed directory service 404 will access the user profile 408 to obtain the set of policies applicable to the user.

As noted above, the policies may include one or more services 414 provided by the computing resource service provider 402 that may be accessible to the user. Accordingly, the policy management sub-system 410 may transmit one or more executable instructions to an identity management service to obtain temporary credentials which may be used to access the one or more services 414. The policy management sub-system 410 may be configured to generate a custom computing resource service provider interface that includes the one or more services 414 the user has been granted access to. Since the policy management sub-system manages the temporary credentials necessary to access the one or more services 414, a user may utilize this custom interface to access the one or more services 414 without need for additional credentials.

In addition to the policies that may be established to control user access to the one or more services 414 provided by the computing resource service provider 402, the customer or delegated administrative user may utilize the interface 406 to access the policy management sub-system 410 to define one or more policies that may affect a user's access to one or more applications 412 within the directory. For instance, a customer or delegated administrative user may interact with the policy management sub-system 410 through the interface 406 to create a policy that, when enforced, prohibits a user or group of users from accessing a word processing application within the directory. Thus, when a user attempts to utilize the word processing application, the user may receive an error message that informs the user that he/she does not have access to the application.

Figure 5:
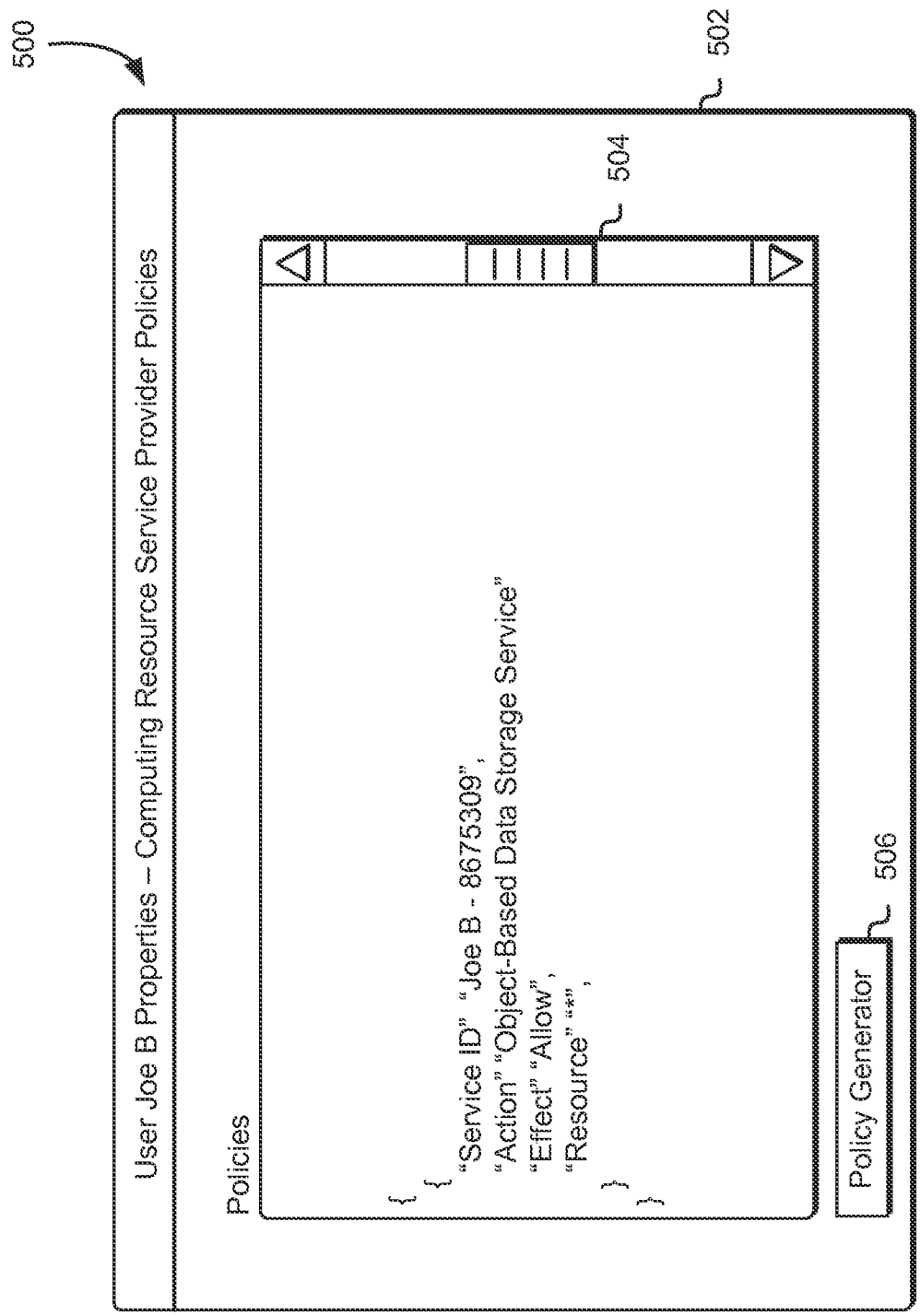
FIG. 5 shows an illustrative example of a set of policies applied to a user in accordance with at least one embodiment.

As noted above, a customer or delegated administrative user may utilize a managed directory service interface to access one or more user profiles to specify a set of policies that, when enforced, may inhibit or enable a user from accessing one or more services provided by the computing resource service provider. Accordingly, FIG. 5 is an illustrative example of a user profile interface 502 for generating one or more policies in accordance with at least one embodiment. The user profile interface 502 may include a policies display 504 that is configured to provide illustrative information as to the policies currently applied to the user profile. For instance, as illustrated in FIG. 5, the policy provided on the policies display 504 may allow the user (in this case, Joe B) to access an object-based data storage service to generate and/or access one or more data objects. Thus, when the user utilizes the URI to access the computing resource service provider interface, the policy management sub-system described above may obtain this policy and transmit one or more executable instructions to an identity management system provided by the computing resource service provider to obtain temporary credentials for access to the object-based data storage service. Additionally, the policy management sub-system may use this obtained policy to customize the computing resource service provider interface in accordance/compliance with the policy.

The user profile interface 502 may include a policy generator button 506 which, when selected by a customer or delegated administrative user, may transmit one or more executable instructions to a network browsing application that may cause the application to access a policy generator. The policy generator may include an interface that may be used to create one or more policies for the specified user. It should be noted that only the customer or delegated administrative users may utilize the policy generator button 506 to create or modify particular user policies using the policy generator. For instance, if a user that has not been identified as a delegated administrative user attempts to use the policy generator button 506, an error message may be transmitted to the user interface which may be configured to inform the user that he/she has not been granted access to the policy generator. Alternatively, the policy generator button 506 may be hidden or disabled if the user does not have access to the policy generator.

Figure 6:
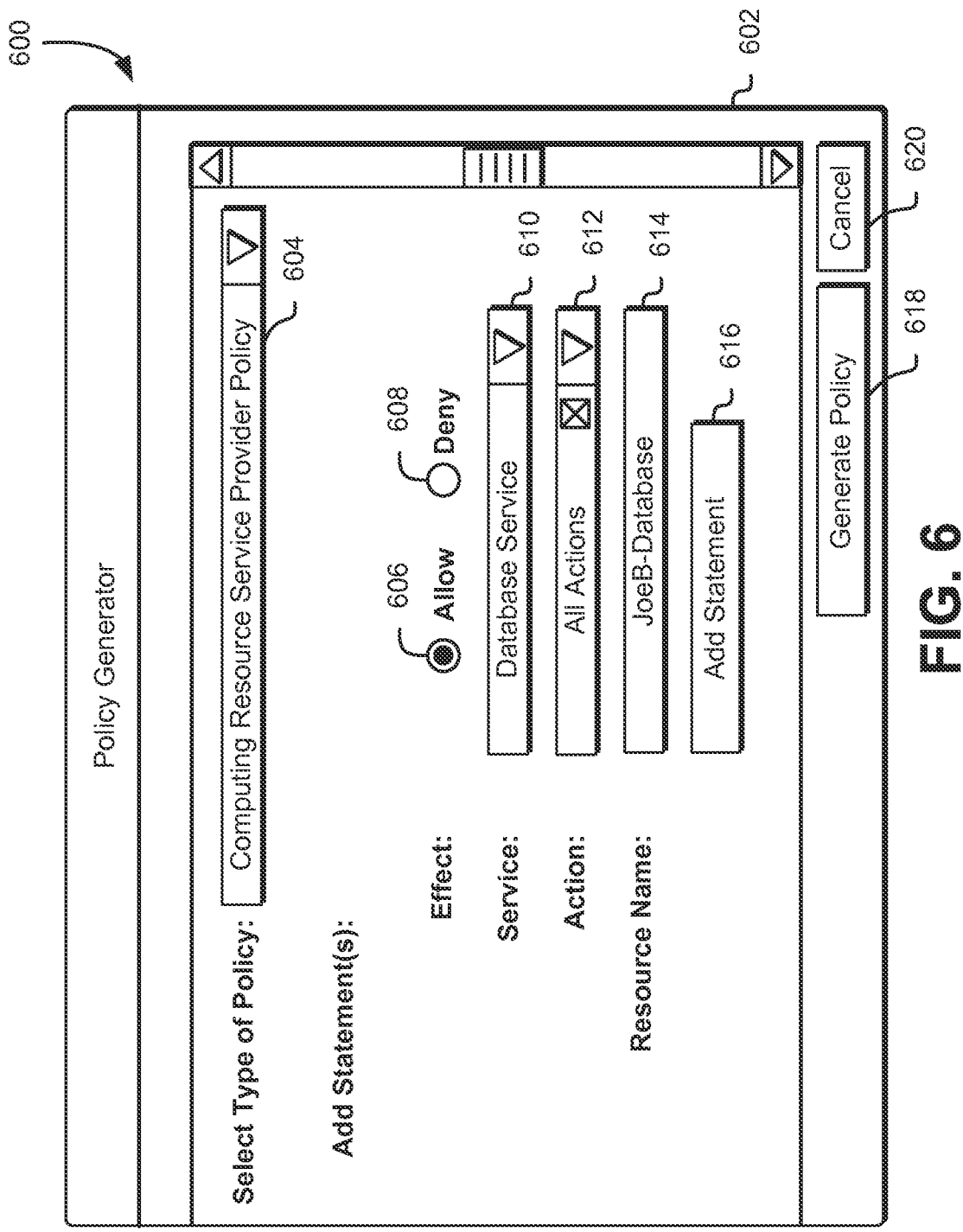
FIG. 6 shows an illustrative example of a policy generator for establishing policies applicable to a user of the managed directory service in accordance with at least one embodiment.

FIG. 6 is an illustrative example of a policy generator 602 for creating and/or modifying one or more policies relevant to one or more services provided by a computing resource service provider in accordance with at least one embodiment. As noted above in connection with FIG. 5, the customer or a delegated administrative user may select a policy generator button within a user profile interface to access the policy generator 602. Accordingly, any policies defined using the policy generator 602 may be applied directly to the respective user profile upon generation of the policies.

The policy generator 602 may include a plurality of components that may be used for defining different policy parameters. For instance, the policy generator 602 may include a policy type selection menu 604 for selecting the type of policy that a customer or delegated administrative user may opt to create and implement. Accordingly, the policy type selection menu 604 may include one or more different policy categories which can be selected. In this illustrative example, the policy type selection menu 604 has been set to a computing resource service provider policy which may be used to specify whether a user is to have access to one or more services provided by the computing resource service provider. While the use of a computing resource service provider policy is used throughout the present disclosure for the purpose of illustration, the policy type selection menu 604 may include a notification service policy, a queue service policy, a logical data container policy and others.

Based at least in part on the type of policy specified using the policy type selection menu 604, the policy generator 602 may generate differing input options for defining the parameters or statements of the particular type of policy chosen. For instance, as illustrated in FIG. 6, if a customer or delegated administrative user selects a computing resource service provider policy from the policy type selection menu 604, the policy generator 602 may present a variety of options for generating a policy statement applicable to one or more services provided by the computing resource service provider.

The policy generator 602 may allow the customer or delegated administrative user to determine the effect of the policy statement. For instance, the policy generator 602 may include an "allow" radio button 606 and a "deny" radio button 608 which may enable the customer to select the effect of the policy statement on a user's permissions within a service. For instance, if a customer or delegated administrative user selects the "allow" radio button 606, the policy generated would enable a user to access a specified service and perform one or more actions within the service. Alternatively, if a customer or delegated administrative user selects the "deny" radio button 608, the policy generated may deny a user access to one or more services provided by the computing resource service provider and/or deny a user permission to perform one or more actions within a service.

The policy generator 602 may additionally include a service selection menu 610 which may enable a customer or delegated administrative user to specify which service is the target of the policy statement. For instance, as illustrated in FIG. 6, the customer has selected a database service from the service selection menu 610. While the use of a database service is used extensively throughout the present disclosure for the purpose of illustration, the service selection menu 610 may include a variety of other services, such as an object-based data storage service, a virtual computer system service and others. Accordingly, the policy generator 602 may be configured to provide a list of available actions that are associated with the selected service in order for a customer or delegated administrative user to specify which one or more actions are to be included in the policy statement. This list of available actions may be compiled into an action selection menu 612.

Thus, the policy generator 602 may include an action selection menu 612 which may enable a customer or delegated administrative user to specify one or more actions a particular user or group of users may or may not (dependent upon the selection of the "allow" radio button 606 or of the "deny" radio button 608) take within the selected service. The list of actions included within the action selection menu 612 may include a plurality of API calls or commands relevant to the selected service that, when transmitted to the service, may cause the service to perform these actions. Each action listed in the action selection menu 612 may include a selection box, which a customer or delegated administrative user may use to select the one or more actions that are to be part of the policy statement. Alternatively, a customer or delegated administrative user may select "all actions" in order to encompass all actions without being required to select all selection boxes within the action selection menu 612.

The customer or delegated administrative user may maintain one or more resources within each service provided by the computing resource service provider that may be subject to differing levels of access and security. Accordingly, the policy generator 602 may include a resource name field 614, which a customer or delegated administrative user may use to select a resource within the selected service that will be subject to the policy statement. For instance, as illustrated in FIG. 6, the customer or delegated administrative user has selected a user-specific resource within the database service, "JoeB-Database." Accordingly, any actions selected using the action selection menu 612 described above would apply solely to this resource within the selected service. However, if the customer or delegated administrative user desires to apply the selected actions to multiple resources within the service, the customer or delegated administrative user may be able to use a variety of wildcard character strings to identify multiple resources. For instance, if the customer or delegated administrative user opts to apply this policy statement to all resources available within the selected service, the customer or delegated administrative user may use "*" within the resource name field 614 to specify all resources.

Once the customer or delegated administrative user has specified all the parameters (service, actions and resources) for the relevant policy statement, the customer or delegated administrative user may opt to add additional policy statements which may apply to other services or resources. Thus, the policy generator 602 may include an add statement button 616 which may be used to incorporate the current policy statement and allow a customer or delegated administrative user to generate an additional policy statement. Thus, for this additional policy statement, the customer or delegated administrative user may again select either the "allow" radio button 606 or the "deny" radio button 608 to define the effect of the new statement, use the service selection menu 610 to select the target service for the policy statement, use the action selection menu 612 to identify one or more actions that are to be permitted or denied for the particular user, and use the resource name field 614 to identify the target resources within the target service that will be the subject of the additional policy statement. The customer or delegated administrative user may use the add statement button 616 to add as many policy statements are necessary to define a particular user policy.

If the customer or delegated administrative user has completed generating the necessary policy statements to define the particular user policy, the customer or delegated administrative user may select the generate policy button 618. When the customer or delegated administrative user selects the generate policy button 618, the policy generator 602 may proceed to generate the user policy in accordance with the specified policy statements provided by the customer or delegated administrative user. Subsequently, the policy generator 602 may transmit one or more executable instructions to the managed directory service that, when executed by the managed directory service, may cause the generated policy to be applied to the particular user profile and also display the policy within the user profile interface, as will be illustrated below. Additionally, the policy generator 602 may transmit one or more executable instructions to a policy management sub-system within a managed directory service that, when executed by the policy management sub-system, may cause the policy management sub-system to enable the user to utilize a URI to access a computing resource service provider interface. This interface may be configured to enable the user to only utilize those services provided by the computing resource service provider that the user has been identified within a policy statement as being permissible for use. Alternatively, if the customer or delegated administrative user does not desire to generate the user policy, the customer or delegated administrative user may instead select the cancel button 620 and exit the policy generator 602.

Figure 7:
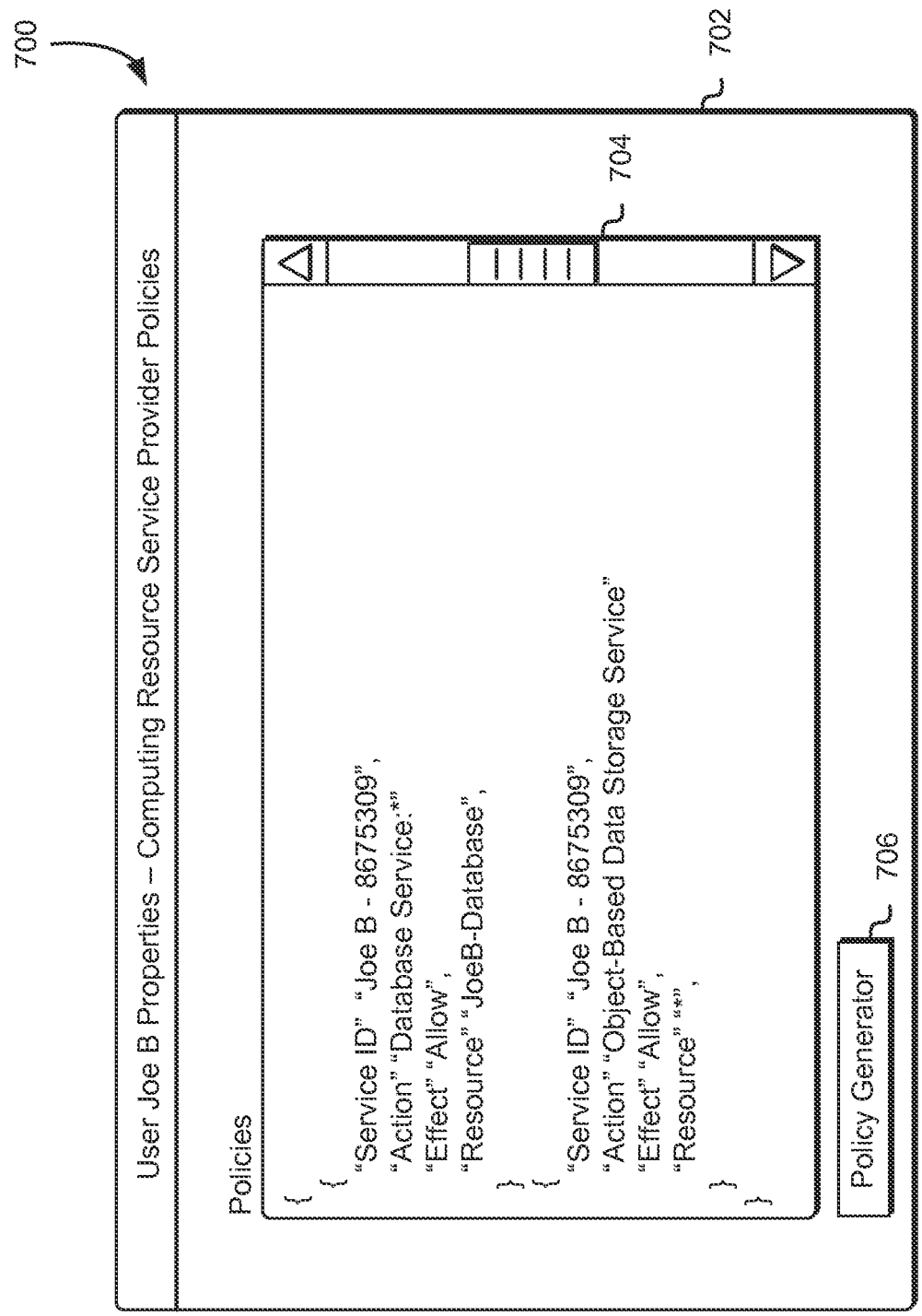
FIG. 7 shows an illustrative example of a set of policies applied to a user of the managed directory service as a result of the policy generator in accordance with at least one embodiment.

As noted above, the generation of a new user policy by utilizing the policy generator may cause the new policy to be displayed in the user profile interface. Accordingly, FIG. 7 is an illustrative example of a user profile interface 702 with one or more newly introduced user policies in accordance with at least one embodiment. As noted above, the user policy interface 702 may include a plurality of components, namely a policies display 704 and a policy generator button 706. The policies display 704 may be configured to display one or more policies that may be applicable to the particular user whose user profile is being reviewed. Accordingly, once the customer or delegated administrative user has utilized the policy generator to create and implement one or more new policy statements, these new policy statements may appear on the policies display 704.

For instance, if a policy is created utilizing the inputs illustrated in FIG. 6, the new policy statement within the policies display may include these inputs. For instance, as illustrated in FIG. 7, the new policy statement may include the affected service provided by the computing resource service provider (e.g., Database Service), the applicable resources within the service (e.g., JoeB-Database), the effect of the policy (e.g., allow) and the actions that the user may take within the cited resources in the service (e.g., "*" or all actions).

In addition to these policy statements, the policies display 704 may display a service identification value for the affected user. This identification value may be a temporary identification name for the user that may be used to access the service or services displayed in the policies display 704. For instance, in this illustrative example, the user may be assigned a temporary identification name for accessing the database service. Thus, when the user uses the URI to access one or more services provided by the computing resource service provider, the managed directory service, through a policy management sub-system, may access this user profile to obtain the temporary identification name of the user. Subsequently, the policy management sub-system may transmit this information to an identity management service in order to obtain temporary user credentials. Accordingly, when the user submits a request through an interface provided by the managed directory service to access one or more services provided by the computing resource service provider, the managed directory service may use these temporary credentials to obtain user access to these services.

If the customer or delegated administrative user desires to generate a new policy statement or make changes to the currently implemented policies, the customer or delegated administrative user may again utilize the policy generator button 706 to access the policy generator and make the desired changes. The changes made to the user policies may accordingly appear in the policies display 704 as necessary. It should be noted that in the illustrative example of FIG. 7, the policies display 704 includes the new policy statements generated using the policy generator and the policy statements introduced in FIG. 5. While the addition of policy statements through use of the policy generator is used through the present disclosure for the purpose of illustration, it should be noted that the policy generator may be used to also overwrite or remove any existing policies applicable to the user.

Figure 8:
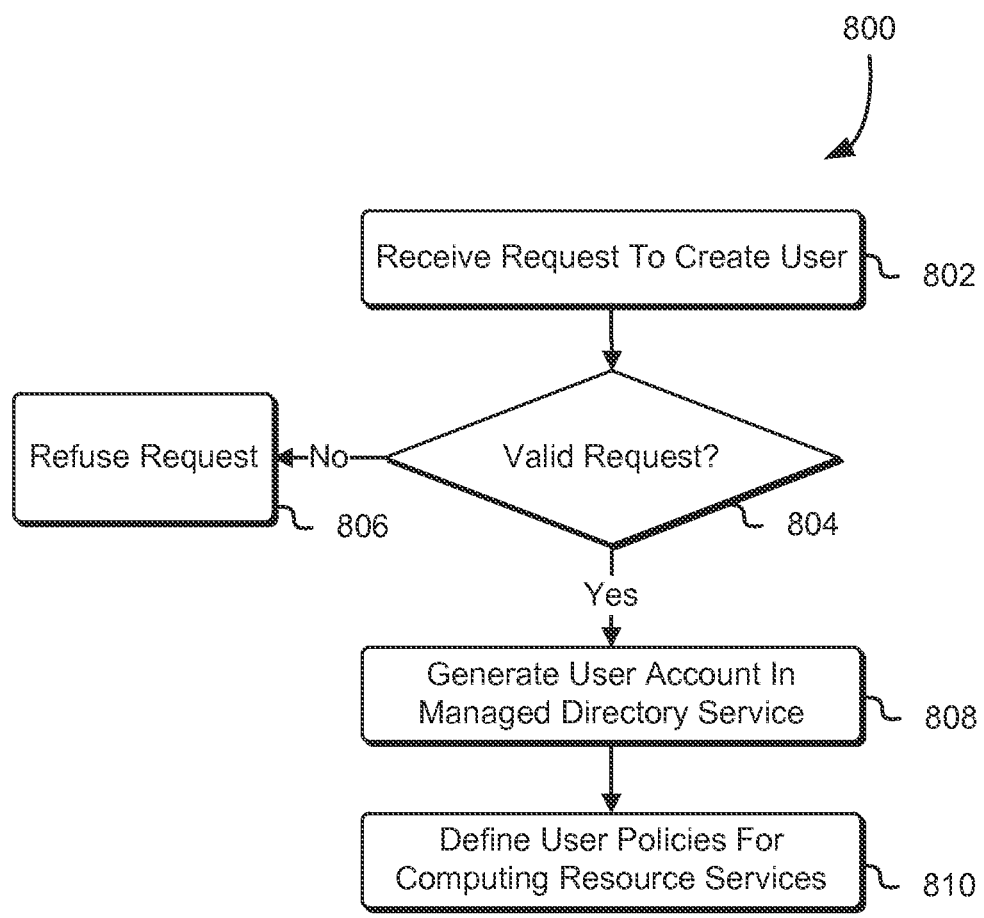
FIG. 8 shows an illustrative example of a process for defining user access to one or more computing resource services in accordance with at least one embodiment.

As noted above, a customer may submit one or more requests to a managed directory service to configure a directory which may be used to facilitate data sharing and/or availability amongst one or more users. This may include one or more requests for establishing one or more users that may be delegated access to the directory and one or more other services provided by the computing resource service provider. Accordingly, FIG. 8 is an illustrative example of a process 800 for defining user access to one or more computing resource services in accordance with at least one embodiment. The process 800 may be performed by a customer or other delegated administrative user with authorization to manage the directory in the managed directory service through a policy management sub-system.

As noted above, a customer may be an organization that may use a directory in support of its business needs. Accordingly, the customer may require that one or more other users access the directory in order to access information necessary to support a business task. Thus, the customer or other delegated administrative user may receive 802 a request to create a new user profile within the managed directory service such that the user may access the directory. The request may originate from one or more employees of the customer organization desiring to obtain access to the directory in order to perform one or more tasks. The request may also originate from an entity outside of the customer organization that may be a customer of the customer organization.

Since the received request may originate from myriad sources, the customer or delegated administrative user may be required to determine 804 whether the received request is valid. For instance, the customer or delegated administrative user may evaluate the request to determine whether the request originated from an employee account within the organization and whether said employee should be granted access to the directory. Alternatively, if the request originates from an outside entity, the customer or delegated administrative user may evaluate whether the entity should be given access to the directory or whether the entity does not have the necessary authorization. Accordingly, if the request to create a new user is not valid, the customer or delegated administrative user may refuse 806 the request.

If the request to create a new user account within the managed directory service is valid, the customer or delegated administrative user may generate 808 a new user account within the service. For instance, the customer or delegated administrative user may create a new user profile for the new user and incorporate any user details into the profile to enhance the user's access to the service. Additionally, the customer or delegated administrative user may utilize the managed directory service to generate a set of credentials for the user which the user may use to access the managed directory service. As will be described in greater detail below, the user may use this set of credentials to additionally access one or more services provided by the computing resource service provider, obviating the need for additional sets of credentials.

Once the user account within the managed directory service has been created, the customer or delegated administrative user may access the user profile to define 810 one or more policies for accessing one or more services provided by the computing resource service provider. As noted above in connection with FIGS. 5 and 7, the user profile interface may include a listing of all policies currently implemented and a policy generator button that may be used to access a policy generator. Through the use of the policy generator, the customer or delegated administrative user may define one or more policy statements. Each policy statement may be configured to define whether a user is to have access to one or more services provided by the computing resource service provider, as well as the actions and resources the user may take advantage of within these services. Alternatively, the customer or delegated administrative user may utilize the policy generator to define certain restrictions on a user's access to these one or more services. Once the customer or delegated administrative user has defined the policies that are to be enforced, the policies may appear within the user profile interface and may be amended at any time based on the customer's requirements.

As noted above, after the customer or delegated administrative user has completed generating the one or more policy statements within the policy generator, the policy generator may transmit one or more executable instructions to the policy management sub-system that, when executed by the policy management sub-system, causes the policy management sub-system to incorporate the newly generated user policies. In addition to the incorporation of these policies, the policy management sub-system may additionally enable a user to utilize a URI to access a computing resource service provider interface to access one or more services provided by the computing resource service provider. Accordingly, the customer or delegated administrative user may deliver the URI to the user in order for the user to access the services provided by the computing resource service provider.

Figure 9:
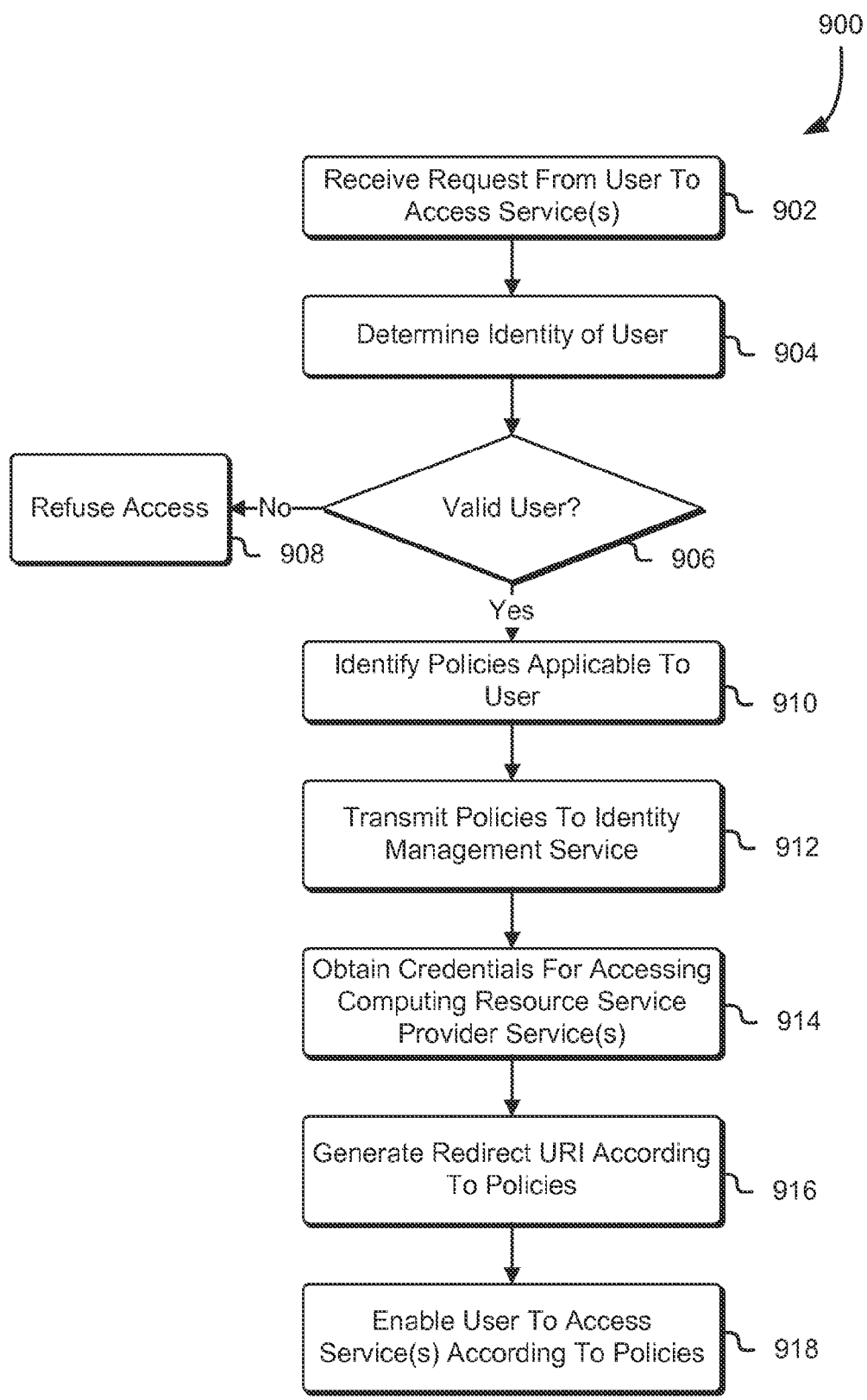
FIG. 9 shows an illustrative example of a process for enabling user access to one or more computing resource services in accordance with at least one embodiment.

Once the user has received the URI from the customer or delegated administrative user, the user may now begin to submit one or more requests to access one or more services provided by the computing resource service provider. Accordingly, FIG. 9 is an illustrative example of a process 900 for enabling user access to one or more computing resource services in accordance with at least one embodiment. The process 900 may be performed by the policy management sub-system of the managed directory service. The policy management sub-system may be configured to access one or more other components of the managed directory service, namely a user profile of the user submitting the one or more requests, and additionally communicate with the computing resource service provider to establish user access to the one or more services.

When the user uses the URI to access a computing resource service provider interface to further access one or more services provided by the computing resource service provider, the policy management sub-system may detect that a user has utilized the URI and may begin to verify the user request to ensure that the user has been granted access to these services. Accordingly, the policy management sub-system may receive 902 a request from the user to access one or more services provided by the computing resource service provider. As noted above, the URI may be used to access an interface. Since access to the interface through a URI may be provided to a variety of customers and/or delegated administrative users, a number of users may have access to the URI. For instance, if the URI was provided to a particular user but the user provides the URI to other entities without authorization to access these services, these other entities may attempt to access these services regardless of their level of authorization.

Accordingly, the policy management sub-system may be configured to determine 904 the identity of the user submitting the request to access the one or more services by utilizing the URI to access the interface. For instance, in order to utilize the URI, each user may be required to provide a set of credentials to access the managed directory service and, from within the service, utilize the URI to access the interface. Accordingly, the policy management sub-system may be able to identify the user submitting the request through this set of credentials.

Once the policy management sub-system has determined the identity of the user submitting the request, the policy management sub-system may determine 906 whether this particular user is a valid user and, accordingly, has been granted access to the one or more services requested. As noted above, if a user provided the URI to one or more other users, these other users may use the URI to attempt to access these services. However, since each user of the managed directory service is required to provide a set of credentials to access the managed directory service and utilize the URI, the policy management sub-system may be able to determine 904 the identity of the user utilizing the URI. If the user has not been granted access to any services provided by the computing resource service provider, then the unauthorized user may not be a valid user and the policy management sub-system may refuse 908 access to these one or more services. Additionally, if the user has had his/her access to these one or more services revoked subsequent to enabling the user to utilize the URI to access the computing resource service provider interface, the policy management sub-system may evaluate the user's profile and accordingly refuse 908 access to these services.

If the policy management sub-system evaluates the user's set of credentials and determines that the user does have proper access to the one or more services provided by the computing resource service provider, the policy management sub-system may access the user's profile to identify 910 the one or more policies that are applicable to the user. As noted above, the customer or delegated administrative user may access a policy generator through a user's profile to define one or more policy statements applicable to the user. These policy statements may be used to define the parameters of a user's access to the one or more services provided by the computing resource service provider. After the policy statements have been generated, the policies may appear within the user profile. Thus, the policy management sub-system may access the user's profile and extract the applicable policies for the one or more services the user has requested to access.

Once the policy management sub-system has obtained the applicable policies from the user's profile, the policy management sub-system may transmit 912 these policies to an identity management service provided and managed by the computing resource service provider for processing. The identity management service may be configured to apply the policies included in the user profile such that when the user accesses these one or more services, the user may only perform the actions within the services according to the policies established by the customer or delegated administrative user. Additionally, the policy management sub-system may transmit one or more requests to the identity management service to obtain 914 one or more temporary sets of credentials which may be used to access the one or more services provided by the computing resource service provider. Thus, when a user utilizes the interface to access the one or more services, the policy management sub-system may access these temporary sets of credentials and transmit these to the appropriate service provided by the computing resource service provider to establish user access to the service. It should be noted that these temporary sets of credentials may be temporary in the sense that the sets of credentials may not be accessible to the user after occurrence of a specific event. For example, when a user terminates a session with a service provided by the computing resource service provider (e.g., by closing a browser application), the credentials may consequently become inaccessible to the user even though the credentials have yet to expire. In such instances, to initiate a new session, the managed directory service may be required to obtain a new temporary set of credentials to enable the user to access the service.

Once the policy management sub-system has obtained the temporary sets of credentials necessary to access the one or more services provided by the computing resource service provider, the policy management sub-system may utilize the policies applicable to the user to generate 916 one or more redirect URI for accessing these services according to the applicable user policies. The one or more redirect URI may be used by the user to access interfaces for the one or more services the user has been granted access to as well as any resources and actions available to the user in accordance with the policies provided in the user profile.

The user may use the redirect URI for each service to perform one or more actions permissible under the policies defined for the user within the one or more services. Accordingly, the policy management sub-system may be configured to transmit the user request, along with the temporary sets of credentials, to the computing resource service provider management sub-system to enable 918 the user access to the one or more services in accordance with the policies set forth for the user. Thus, the user may now access the one or more services and perform various tasks in conformity with the customer or delegated administrative user requirements.

Figure 10:
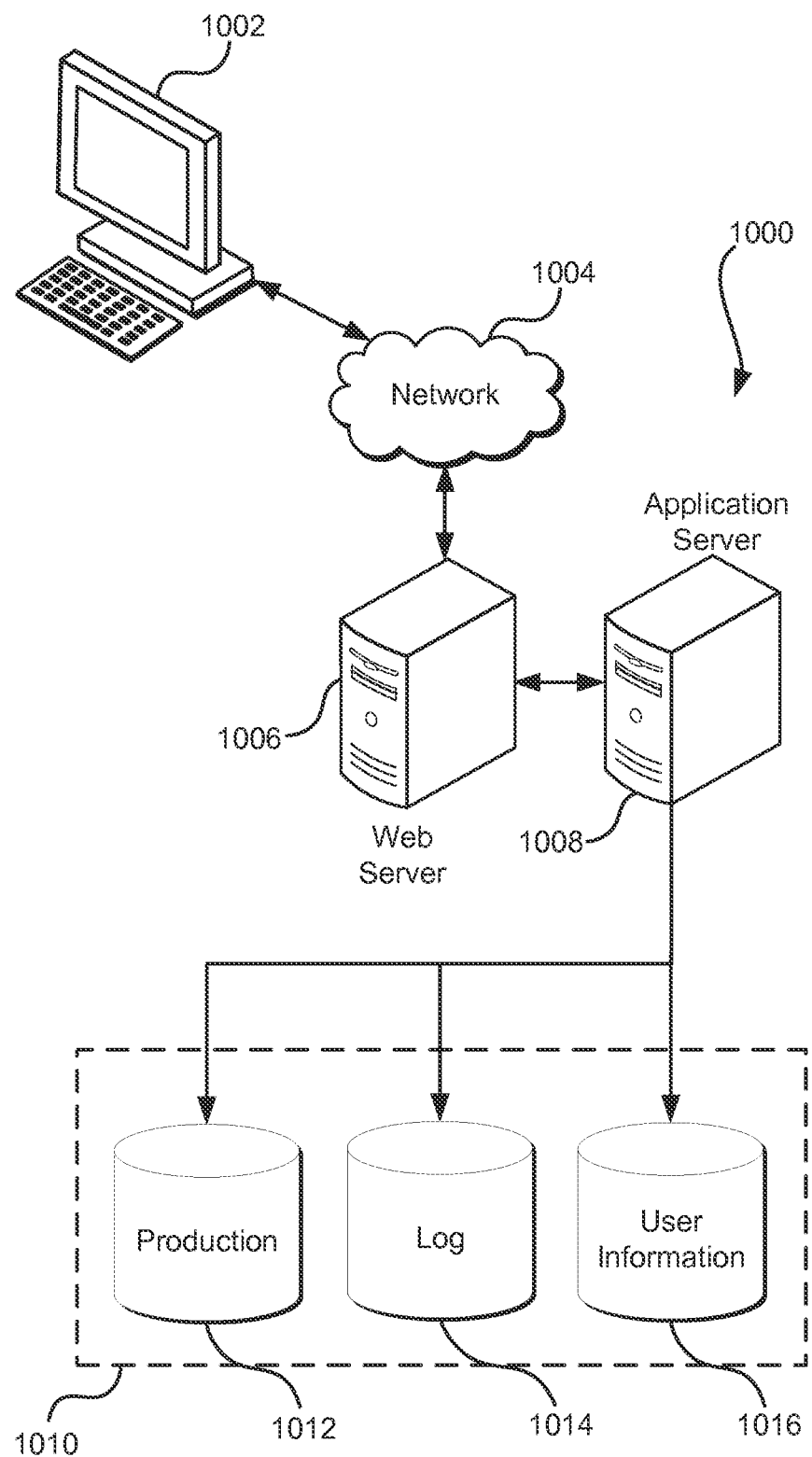
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for enabling access to one or more computing system services provided by a computing resource service provider, comprising:
   under the control of one or more computer systems configured with executable instructions,
   enabling a user to utilize a set of credentials to access resources in a directory within a managed directory service;
   receiving, at the managed directory service, a first request from the user to access a subset of the one or more computing system services, different from the managed directory service, provided by the computing resource service provider, the first request comprising information based at least in part on the set of credentials;
   authenticating, at the managed directory service, the user based at least in part on the set of credentials;
   on a first condition that the user has been authenticated, identifying, at the managed directory service, one or more policies applicable to the user, the one or more policies at least defining a level of access to the one or more services based at least in part on the first request, the one or more policies defined using a policy generator interface that enables an administrative user to define the one or more policies based at least in part on the one or more services;
   on a second condition that the identified one or more policies allow access, transmitting to an identity management service, different from the managed directory service, a second request for a set of one or more temporary credentials wherein the temporary credentials enable the user to access a subset of the one or more services;
   receiving the set of one or more temporary credentials from the identity management service;
   providing a reference to a network location usable to access the one or more services in accordance with the one or more policies; and
   utilizing the received set of one or more temporary credentials to fulfill, at least in part, the first request from the user to access the one or more services.

2. The computer-implemented method of claim 1, wherein the network location is of an interface useable for accessing the one or more services to fulfill, at least in part, the first request from the user to access the one or more services.

3. The computer-implemented method of claim 2, wherein the interface is further configured to enable requests from the user to be transmitted to the identity management service to access the one or more services.

4. The computer-implemented method of claim 1, wherein the one or more policies applicable to the user are defined in a profile at the managed directory service, the profile being specific to the user.

5. A computer system, comprising:
   one or more processors; and
   memory having collectively stored therein instructions that, when executed by the computer system, cause the computer system to:
   authenticate, at a directory service, a requestor utilizing credential information for accessing a directory within the directory service;
   identify one or more policies applicable to the requestor, the one or more policies defined using a policy generator interface that enables an administrative user to define the one or more policies based at least in part on the one or more services;
   receive, from the requestor, a request to access a subset of one or more services provided by a computing resource service provider, access to the subset of the one or more services managed by the directory within the directory service;

as a result of authenticating the requestor, obtain, from a second service different from the directory service, temporary credential information to access the subset of the one or more services;

provide a reference to a network location usable to access the one or more services in accordance with the one or more policies; and utilize the temporary credential information obtained from the second service, to fulfill, at least in part, the request to access the subset of the one or more services.

6. The computer system of claim 5, wherein the request comprises information based at least in part on the credential information.

7. The computer system of claim 5, wherein the instructions further cause the computer system to enable the requestor to access, from the directory service, an interface accessible based at least in part on the authentication of the requestor to fulfill, at least in part, the request to access the subset of the one or more services.

8. The computer system of claim 7, wherein the instructions further cause the computer system to provide a representation of a network address for the interface useable by the requestor to submit the request to access the subset of the one or more services.

9. The computer system of claim 5, wherein the instructions that cause the computer system to obtain the temporary credential information further cause the computer system to communicate with the second service to request the temporary credential information and receive the temporary credential information from the second service.

10. The computer system of claim 5, wherein the temporary credential information is configured to become unusable by the requestor as a result of the requestor terminating its access to the subset of the one or more services.

11. A non-transitory computer-readable storage medium having collectively stored thereon executable instructions that, when executed by one or more processors of a computer system, cause the computer system to at least:

verify, at a directory service, a requestor utilizing credential information to access a directory within the directory service is authorized to access the directory;

receive, from the requestor, a request to access a subset of one or more services provided by a computing resource service provider;

as a result of verifying, at the directory service, that the requestor is authorized to access the directory, identify one or more policies applicable to the requestor, the one or more policies managed by the directory within the directory service, defined using a policy generator interface that enables an administrative user to define the one or more policies based at least in part on the one or more services, and usable to define a level of access to the subset of the one or more services;

on a condition that the identified one or more policies allow access, obtain, from a second service different from the directory service, temporary credential information to access the subset of the one or more services;

provide a reference to a network location usable to access the one or more services in accordance with the one or more policies; and utilize the temporary credential information obtained from the second service to fulfill, at least in part, the request to access the subset of the one or more services.

12. The non-transitory computer-readable storage medium of claim 11, wherein the request comprises information based at least in part on the credential information.

13. The non-transitory computer-readable storage medium of claim 11, wherein the executable instructions further cause the computer system to enable the requestor to access, from the directory service, an interface accessible based at least in part on the verification of the requestor to fulfill, at least in part, the request to access the subset of the one or more services.

14. The non-transitory computer-readable storage medium of claim 13, wherein the instructions further cause the computer system to provide a representation of a network address for the interface useable by the requestor to submit the request to access the subset of the one or more services.

15. The non-transitory computer-readable storage medium of claim 11, wherein the one or more policies applicable to the requestor are defined in a profile stored within the directory, the profile being specific to the requestor.

16. The non-transitory computer-readable storage medium of claim 11, wherein the temporary credential information is configured to becomes unavailable to the requestor as a result of the requestor terminating its access to the subset of the one or more services.

17. The non-transitory computer-readable storage medium of claim 11, wherein the instructions that cause the computer system to obtain the temporary credential information further cause the computer system to communicate with the second service to request the temporary credential information and receive the temporary credential information from the second service.

18. The computer-implemented method of claim 1, wherein the reference is a uniform resource indicator.

19. The system of claim 5, wherein the reference is a uniform resource indicator.

20. The non-transitory computer-readable storage medium of claim 11, wherein the reference is a uniform resource indicator.

* * * * *